(12) United States Patent
Torii et al.

(10) Patent No.: US 11,997,379 B2
(45) Date of Patent: May 28, 2024

(54) IMAGE PROCESSING SYSTEM, IMAGE PROCESSING APPARATUS, AND IMAGE PROCESSING METHOD

(71) Applicants: Osamu Torii, Kanagawa (JP); Kohei Marumoto, Tokyo (JP); Yusuke Fukuoka, Tokyo (JP)

(72) Inventors: Osamu Torii, Kanagawa (JP); Kohei Marumoto, Tokyo (JP); Yusuke Fukuoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 17/631,047

(22) PCT Filed: Sep. 4, 2020

(86) PCT No.: PCT/IB2020/058226
§ 371 (c)(1),
(2) Date: Jan. 28, 2022

(87) PCT Pub. No.: WO2021/059056
PCT Pub. Date: Apr. 1, 2021

(65) Prior Publication Data
US 2022/0321796 A1 Oct. 6, 2022

(30) Foreign Application Priority Data
Sep. 25, 2019 (JP) .................. 2019-174558

(51) Int. Cl.
*H04N 23/63* (2023.01)
*G06F 16/11* (2019.01)
*G06F 16/16* (2019.01)

(52) U.S. Cl.
CPC .......... *H04N 23/632* (2023.01); *G06F 16/11* (2019.01); *G06F 16/164* (2019.01)

(58) Field of Classification Search
CPC .. H04N 23/632; H04N 23/698; H04N 23/661; H04N 23/635; G06F 16/11;
(Continued)

(56) References Cited

U.S. PATENT DOCUMENTS 6,563,529 B1   5/2003   Jongerius
8,498,453 B1 *  7/2013   Benson ................ G06V 40/171
                                                  382/118
(Continued)

FOREIGN PATENT DOCUMENTS

JP   2008-078802 A   4/2008
JP   2014-127001     7/2014
(Continued)

OTHER PUBLICATIONS

International Search Report dated Nov. 16, 2020 in PCT/IB2020/058226 filed on Sep. 4, 2020.

*Primary Examiner* — Timothy J Henn
(74) *Attorney, Agent, or Firm* — Harness, Dickey & Pierce, P.L.C.

(57) ABSTRACT

An image processing system includes a generating unit and a storing unit. The generating unit determines a subject included in a wide-angle image and generate a partial image including the subject from the wide-angle image. The storing unit stores the partial image in association with the wide-angle image from which the partial image is extracted.

20 Claims, 11 Drawing Sheets

(58) Field of Classification Search
CPC . G06F 16/164; G06F 3/04815; G06T 3/0018; G06T 11/00
See application file for complete search history.

(56) References Cited

U.S. PATENT DOCUMENTS

| | | | | |
|---|---|---|---|---|
| 8,670,046 | B2* | 3/2014 | Ohba | H04N 9/8205 |
| | | | | 348/240.99 |
| 2002/0126914 | A1 | 9/2002 | Kotake et al. | |
| 2005/0212817 | A1* | 9/2005 | Cannon | H04N 23/635 |
| | | | | 345/619 |
| 2005/0259945 | A1* | 11/2005 | Splaver | H04N 1/00167 |
| | | | | 386/290 |
| 2006/0007311 | A1* | 1/2006 | Watanabe | G09B 29/10 |
| | | | | 348/158 |
| 2006/0274960 | A1* | 12/2006 | Tamaru | G06F 16/51 |
| | | | | 707/E17.031 |
| 2014/0176542 | A1 | 6/2014 | Shohara et al. | |
| 2015/0278581 | A1* | 10/2015 | Fukushima | G06V 40/164 |
| | | | | 382/118 |
| 2016/0132991 | A1 | 5/2016 | Fukushi | |
| 2016/0165136 | A1 | 6/2016 | Mitsui et al. | |
| 2017/0026584 | A1* | 1/2017 | Park | H04N 23/632 |
| 2017/0046053 | A1* | 2/2017 | Liu | G06F 3/04842 |
| 2017/0177926 | A1 | 6/2017 | Takayama | |
| 2018/0069983 | A1* | 3/2018 | Cho | H04N 23/632 |
| 2021/0065331 | A1* | 3/2021 | Fujiki | G06T 3/0018 |

FOREIGN PATENT DOCUMENTS

| | | |
|---|---|---|
| JP | 2015-018296 | 1/2015 |
| JP | 2016-110639 A | 6/2016 |
| JP | 2017-118472 A | 6/2017 |
| JP | 2017-212510 A | 11/2017 |
| JP | 2018-164143 | 10/2018 |
| JP | 2018-198064 | 12/2018 |
| WO | WO-2007/055335 A1 | 5/2007 |

* cited by examiner

FIG. 4A

| CONTET ID (411) | CONTENT NAME (412) |
|---|---|
| A0001 | A APARTMENT, NO. 101 |
| A0002 | B HEIGHTS, NO. 203 |
| A0003 | C RESIDENCE, NO. 505 |
| ... | ... |

FIG. 4B

| WIDE-ANGLE IMAGE ID (421) | WIDE-ANGLE IMAGE STORAGE LOCATION (422) | WIDE-ANGLE IMAGE NAME (423) | RELATED CONTENT ID (424) |
|---|---|---|---|
| B0001 | https://●●●.jp/panorama/xxx | LIVING | A0001 |
| B0002 | https://●●●.jp/panorama/yyy | KITCHEN | A0001 |
| B0003 | https://●●●.jp/panorama/zzz | ENTRANCE | A0002 |
| ... | ... | ... | ... |

FIG. 4C

| PARTIAL IMAGE ID (431) | PARTIAL IMAGE STORAGE LOCATION (432) | PARTIAL IMAGE NAME (433) | EXTRACTION SOURCE WIDE-ANGLE IMAGE ID (434) | EXTRACTION POSITION INFORMATION (START POSITION) TO (END POSITION) (435) |
|---|---|---|---|---|
| C0001 | https://●●●.jp/image/xxx | LIVING_01 | B0001 | $(x_1,y_1)$ TO $(x_2,y_2)$ |
| C0002 | https://●●●.jp/image/xxx | LIVING_02 | B0001 | $(x_3,y_3)$ TO $(x_4,y_4)$ |
| C0003 | https://●●●.jp/image/xxx | LIVING_03 | B0001 | $(x_5,y_5)$ TO $(x_4,y_4)$ |
| C0004 | https://●●●.jp/image/yyy | KITCHEN_01 | B0002 | $(x_7,y_7)$ TO $(x_8,y_8)$ |
| C0005 | https://●●●.jp/image/yyy | KITCHEN_02 | B0002 | $(x_9,y_9)$ TO $(x_{10},y_{10})$ |
| C0005 | https://●●●.jp/image/yyy | KITCHEN_03 | B0002 | $(x_{11},y_{11})$ TO $(x_{12},y_{12})$ |
| C0004 | https://●●●.jp/image/zzz | ENTRANCE_01 | B0003 | $(x_{13},y_{13})$ TO $(x_{14},y_{14})$ |
| ... | ... | ... | ... | ... |

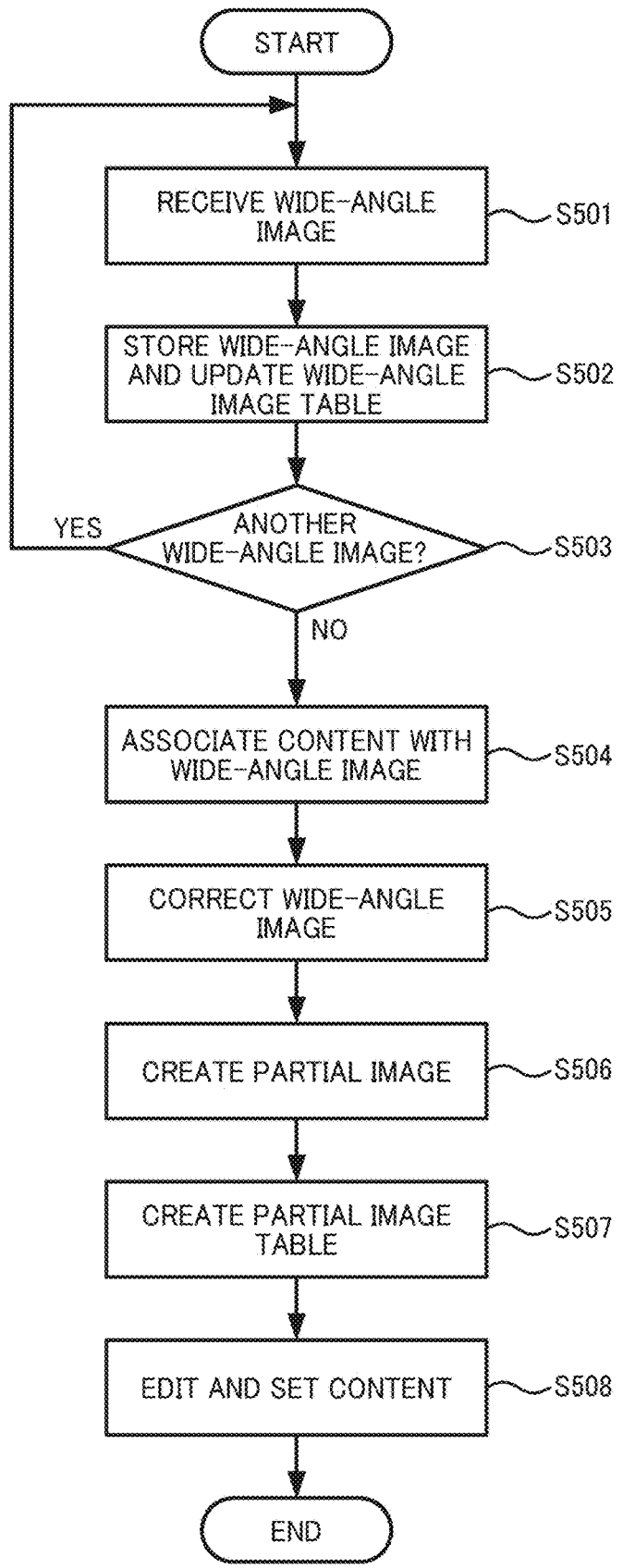

FIG. 10A

| CONTENT ID | CONTANTE NAME | MAP ID |
|---|---|---|
| A0001 | A APARTMENT, NO. 101 | D0001 |
| A0002 | B HEIGHTS, NO. 203 | D0002 |
| A0003 | C RESIDENCE, NO. 505 | D0003 |
| ... | ... | ... |

FIG. 10B

| WIDE-ANGLE IMAGE ID | ... | RELATED MAP ID | CAPTURING POSITION ICON | CAPTURING POSITION COORDINATES | | ANGLE DIRECTION |
|---|---|---|---|---|---|---|
| | | | | HORIZONTAL | VERTICAL | |
| B0001 | ... | D0001 | 1 | 0.5 | 0.4 | 240° |
| B0002 | ... | D0001 | 2 | 0.5 | 0.8 | 180° |
| B0003 | ... | D0002 | 1 | 0.8 | 0.3 | 270° |
| ... | ... | ... | ... | ... | ... | ... |

IMAGE PROCESSING SYSTEM, IMAGE PROCESSING APPARATUS, AND IMAGE PROCESSING METHOD

CROSS-REFERENCE TO RELATED APPLICATIONS

This application is a national phase under 35 U.S.C. § 371 of PCT International Application No. PCT/IB2020/058226 which has an International filing date of Sep. 4, 2020, which claims priority to Japanese Application No. 2019-174558, filed Sep. 25, 2019, the entire contents of each of which are hereby incorporated by reference.

TECHNICAL FIELD

Embodiments of the present invention relate to an image processing system, an image processing apparatus, and an image processing method for creating a partial image obtained by cutting out a part of a wide-angle image.

BACKGROUND ART

Advertising methods for displaying images on web pages to introduce and advertise various commercial products such as commodities, facilities, services, and real estate properties are widely used. In particular, using a wide-angle image such as a so-called omnidirectional image as an image to be displayed in the content and providing a more realistic effect than a still image can improve the appeal to viewers who are customers.

On the other hand, since there is still a high need for still images, it is necessary to create the content including both wide-angle images and still images. In such a case, it is necessary to separately acquire a wide-angle image and a still image by the corresponding photographic equipment and to edit the images in association with each other. For this reason, the cost of the capturing equipment and the labor of the operator who produces and manages the contents become a burden.

In this regard, PTL 1 (JP-6167703-B1 (JP-2015-018296-A)) discloses a technique in which a partial image is cut out from a wide-angle image and an operation performed on the partial image is interlocked with the wide-angle image. According to PTL 1, it is possible to cut out an image and clarify a relationship between a display range of the image displayed on a screen and information indicating a list of viewpoints on the image.

However, in a related art such as PTL 1, a plurality of partial images and a wide-angle image serving as a cut-out source are not collectively managed as single content, and it is not sufficient to reduce a burden on an operator from the viewpoint of content creation. Therefore, there is a need for providing a technique for reducing the burden on the operator and further reducing the cost.

CITATION LIST

Patent Literature

[PTL 1]
JP-6167703-B1 (JP-2015-018296-A)

SUMMARY OF INVENTION

Problems to be Solved

An object of the present invention is to provide an image processing system, an image processing apparatus, and an image processing method for creating a partial image while reducing a burden on an operator.

Solution to Problem

According to an aspect of the present disclosure, an image processing system includes a generating unit and a storing unit. The generating unit determines a subject included in a wide-angle image and generate a partial image including the subject from the wide-angle image. The storing unit stores the partial image in association with the wide-angle image from which the partial image is extracted.

Advantageous Effects of Invention

According to the present invention, there can be provided an image processing system, an image processing apparatus, and an image processing method for creating a partial image while reducing a burden on an operator.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 4A to 4C are examples of tables stored in a storing unit of the present embodiment.

FIG. 5 is a flowchart of a process for creating content according to an embodiment of the present disclosure.

FIGS. 10A and 10B are tables including map information according to an embodiment of the present disclosure.

DESCRIPTION OF EMBODIMENTS

Figure 1:
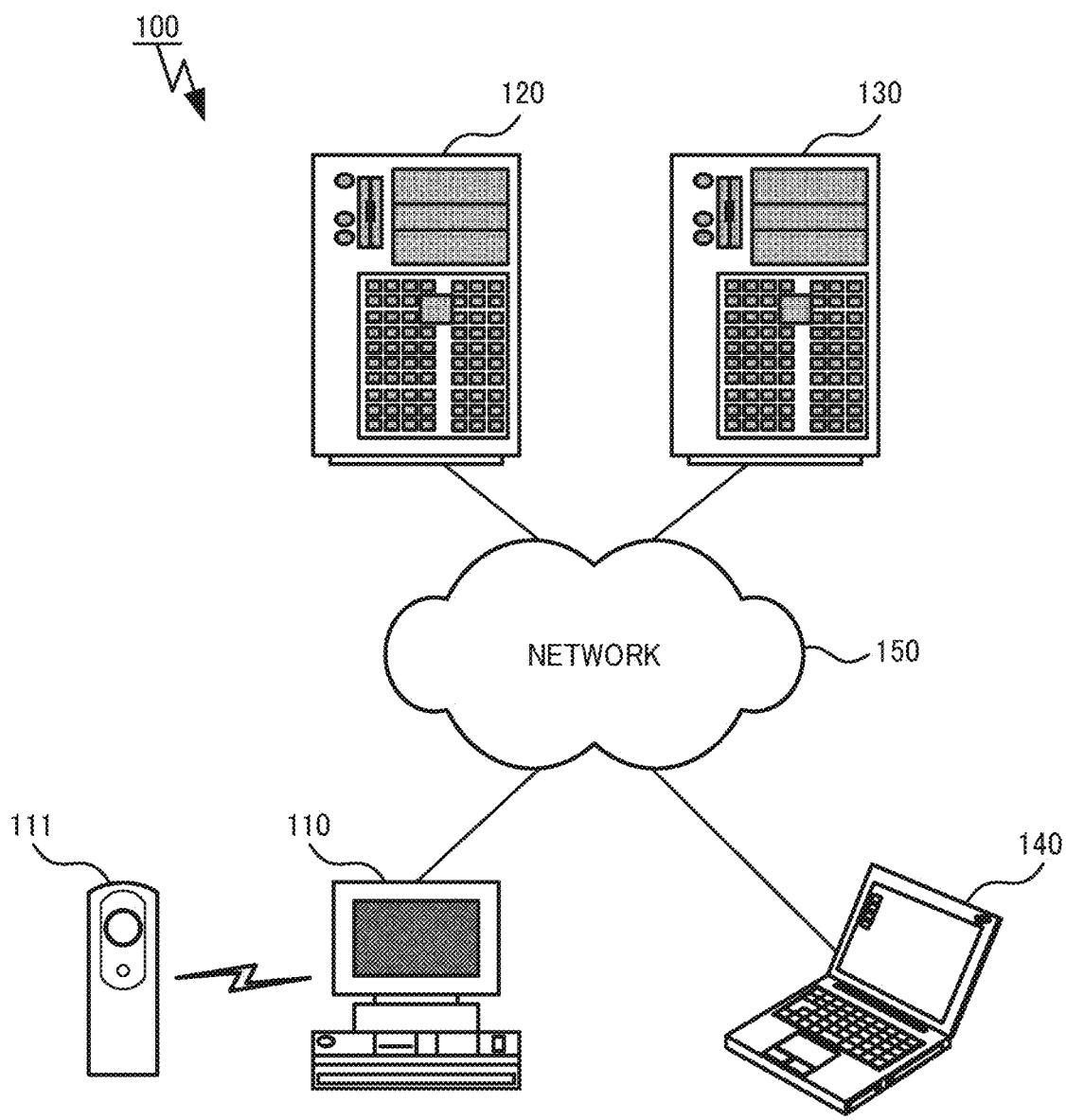
FIG. 1 is a schematic diagram of a hardware configuration of an entire system according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Some embodiments of the present disclosure are described below, but no limitation is indicated thereby and various applications and modifications may be made without departing from the scope of the disclosure. In the drawings referred below, the same reference codes are used for the common elements the description thereof are omitted as appropriate.

FIG. 1 is a schematic diagram illustrating a hardware configuration of an entire system 100 according to an embodiment of the present disclosure. FIG. 1 illustrates, as an example, the system 100 in an environment in which a content editing terminal 110, an image processing apparatus 120, a content storage server 130, and a content viewing terminal 140 are connected via a network 150 such as the Internet or a local area network (LAN). In particular, in the embodiments described below, the content editing terminal 110 and the image processing apparatus 120 may be collectively referred to as an image processing system. A method of connecting each device to the network 150 may be wired or wireless.

The content editing terminal 110 is, for example, a device such as a personal computer, and can be operated by an operator to create and edit content and make various settings. The content editing terminal 110 communicates with the image processing apparatus 120 to upload and download various images and contents. The content editing terminal 110 can acquire an image from an imaging apparatus 111 and transmit the image to the image processing apparatus 120. Here, the imaging apparatus 111 is a device that captures a so-called wide-angle image such as an omnidirectional image, a panoramic image, or a fish-eye image. The image captured by the imaging apparatus 111 may not be a wide-angle image.

In the embodiment described below, the imaging apparatus 111 captures an omnidirectional image. However, embodiments are not particularly limited to the imaging device that captures an omnidirectional image.

The image processing apparatus 120 is an apparatus such as a so-called application server and is an information processing apparatus that receives a wide-angle image from the content editing terminal 110 and creates content related to the wide-angle image.

The content storage server 130 is an apparatus such as a so-called web server and is an information processing apparatus that stores content created and edited by the content editing terminal 110 and the image processing apparatus 120. The content storage server 130 can transmit data of content to be stored in response to a request from the content viewing terminal 140.

The content viewing terminal 140 is, for example, a device such as a personal computer, and is a device that acquires created content from the content storage server 130 and displays the content to a viewer. The content viewing terminal 140 can display content via, for example, a web browser. The content viewing terminal 140 is not limited to a personal computer and may be any of various information processing terminals such as a smartphone terminal and a tablet terminal.

Figure 2:
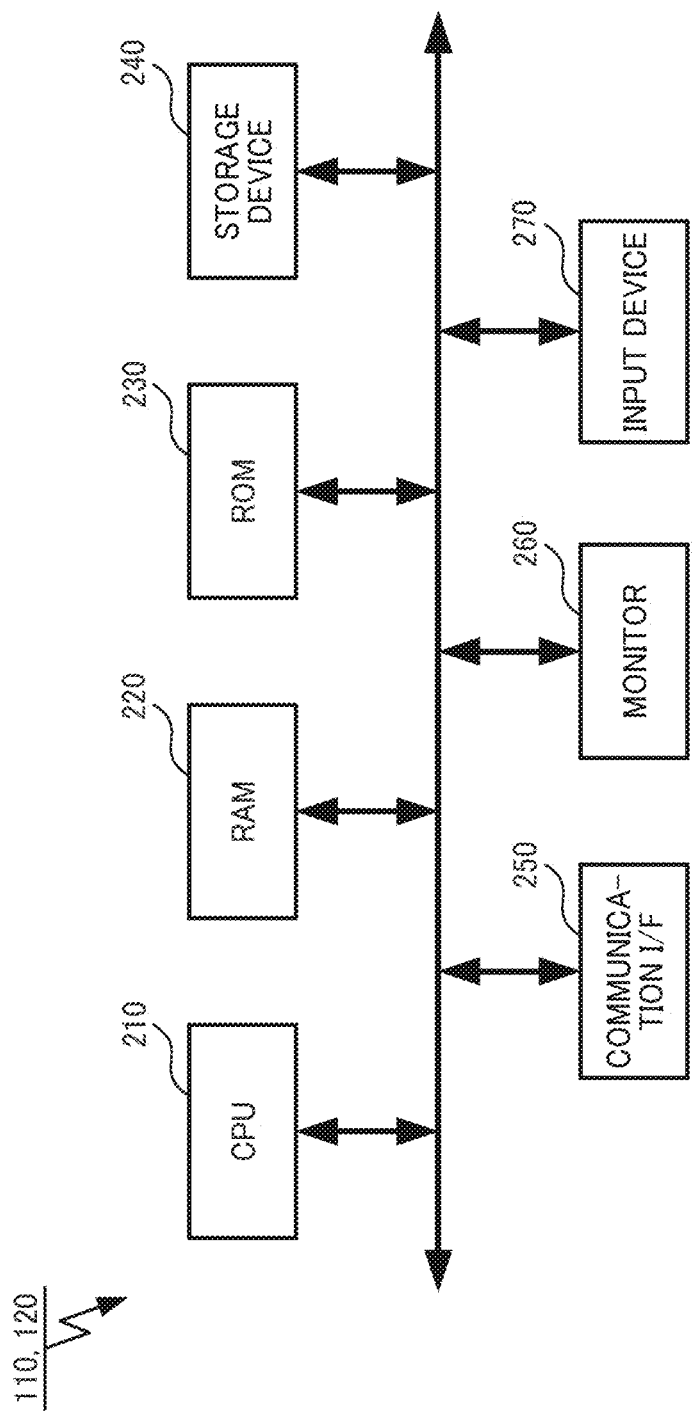
FIG. 2 is a diagram of a hardware configuration included in a content editing terminal and an image processing apparatus according to an embodiment of the present disclosure.

Next, a hardware configuration of each apparatus will be described. In the following descriptions, descriptions of the content storage server 130 and the content viewing terminal 140 may be omitted as appropriate. FIG. 2 is a diagram illustrating a hardware configuration included in the content editing terminal 110 and the image processing apparatus 120 according to the present embodiment. The content editing terminal 110 and the image processing apparatus 120 includes a central processing unit (CPU) 210, a random access memory (RAM) 220, a read only memory (ROM) 230, a storage device 240, a communication interface (I/F) 250, a monitor 260, and an input device 270 that are connected via a bus.

The CPU 210 is a device that executes a program for controlling the operations of the content editing terminal 110 and the image processing apparatus 120 to perform predetermined processing. The RAM 220 is a volatile storage device to provide an execution space of programs executed by the CPU 210 and is used to store and expand programs and data. The ROM 230 is a non-volatile storage device to store firmware and programs executed by the CPU 210.

The storage device 240 is a readable and writable non-volatile storage device, and stores an operating system (OS), various applications, setting information, various data, and the like that cause the content editing terminal 110 and the image processing apparatus 120 to function. The communication I/F 250 connects the content editing terminal 110 or the image processing apparatus 120 to the network 150 and enables communication with other apparatuses via the network 150. Communication via the network 150 may be either wired communication or wireless communication, and various types of data can be transmitted and received using a predetermined communication protocol such as transmission control protocol/Internet protocol (TCP/IP).

The monitor 260 is a device that displays various types of data and the like to a user, and examples thereof include a liquid crystal display (LCD) and the like. The input device 270 is a device for a user to operate the content editing terminal 110 or the image processing apparatus 120, and examples thereof include a keyboard and a mouse. Note that the monitor 260 and the input device 270 may be separate devices or may construct an integrated device such as a touch panel display having both functions of the monitor 260 and the input device 270. The image processing apparatus 120 may not necessarily include the monitor 260 and the input device 270. For example, the image processing apparatus 120 may be operated via the monitor 260 and the input device 270 of the content editing terminal 110.

Figure 3:
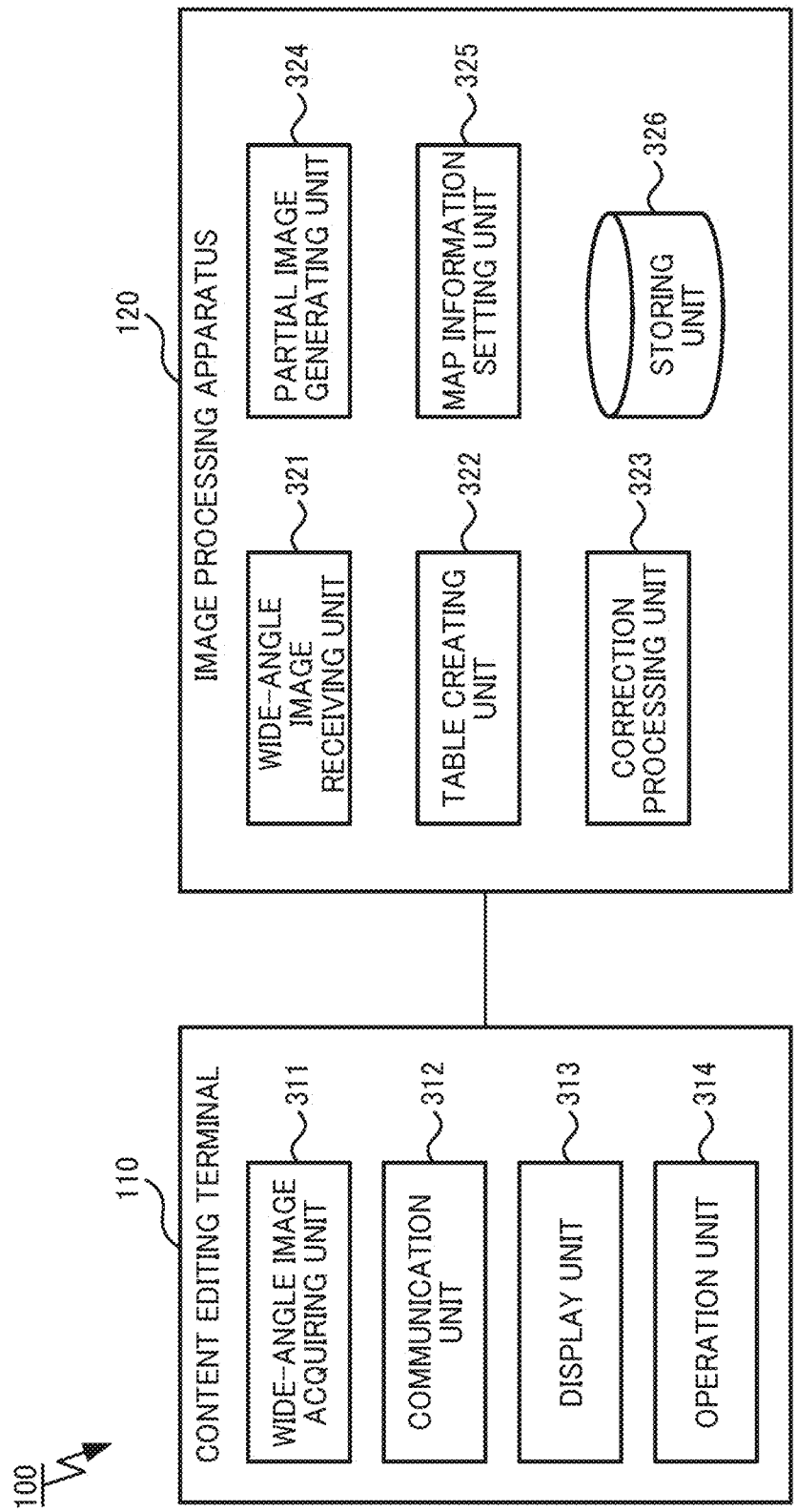
FIG. 3 is a block diagram of software included in the content editing terminal and the image processing apparatus according to an embodiment of the present disclosure.

The hardware configurations included in the content editing terminal 110 and the image processing apparatus 120 according to the present embodiment have been described above. Next, functions implemented by each hardware of the present embodiment are described with reference to FIG. 3. FIG. 3 is a block diagram of software included in the content editing terminal 110 and the image processing apparatus 120 according to the present embodiment. The content editing terminal 110 includes modules of a wide-angle image acquiring unit 311, a communication unit 312, a display unit 313, and an operation unit 314. The image processing apparatus 120 includes modules of a wide-angle image receiving unit 321, a table creating unit 322, a correction processing unit 323, a partial image generating unit 324, a map information setting unit 325, and a storing unit 326.

First, the content editing terminal 110 is described. The wide-angle image acquiring unit 311 acquires image data of a wide-angle image captured by the imaging apparatus 111. The acquired image data is stored in the storage device 240 or the like of the content editing terminal 110. The image data acquired by the wide-angle image acquiring unit 311 may include, in addition to the image data, metadata indicating various situations of the imaging apparatus 111 at the time of imaging. In general, the wide-angle image is acquired from the imaging apparatus 111 via a communication function of, e.g., the communication I/F 250 described above or via a removable memory medium provided in the imaging apparatus 111.

The communication unit 312 controls the communication I/F 250 of the content editing terminal 110 and communicates with the image processing apparatus 120. The content editing terminal 110 can transmit a wide-angle image to the image processing apparatus 120 via the communication unit 312 and receive data such as a partial image and content from the image processing apparatus 120. The communication unit 312 can also transmit an operation via the operation unit 314 to the image processing apparatus 120.

The display unit 313 controls the operation of the monitor 260 of the content editing terminal 110 and displays various user interfaces (UIs). For example, the display unit 313 can display a screen for editing content generated by the image processing apparatus 120, a partial image downloaded from the image processing apparatus 120, and the like.

The operation unit 314 controls the input device 270 of the content editing terminal 110 and receives various operations. The operation accepted by the operation unit 314 can be transmitted to the image processing apparatus 120 via the communication unit 312.

Next, the image processing apparatus 120 is described. The wide-angle image receiving unit 321 controls the communication I/F 250 of the image processing apparatus 120 and receives a wide-angle image transmitted by the content editing terminal 110.

The table creating unit 322 creates various tables related to content creation. In addition, the table creating unit 322 can appropriately update the content of each item of the table. Examples of the table generated by the table creating unit 322 include a content table, a wide-angle image table, and a partial image table, and each table can be stored in the storing unit 326. Details of each table will be described later.

The correction processing unit 323 performs various correction processes on the received wide-angle image. Examples of the correction performed by the correction processing unit 323 include zenith correction, distortion correction, and γ correction. The correction of the wide-angle image by the correction processing unit 323 may be omitted.

The partial image generating unit 324 extracts a partial region of the received wide-angle image and generates the extracted partial region as a partial image. For example, two patterns are conceivable as the configuration of the partial image generating unit 324. The first is a configuration in which a partial image is generated by determining a subject included in a wide-angle image based on a composition, importance, or like of the wide-angle image and extracting a region including a characteristic subject. The second is a configuration in which the user determines a composition and a region of an image to be cut from the wide-angle image to generate a partial image. Note that the method of determining the partial image to be extracted is not limited to the above-described method, and various methods can be adopted. For example, the partial image may be determined based on the structure of a building included in the wide-angle image. Further, the partial image generating unit 324 can determine the article name of the subject based on the detected feature amount of the subject by adopting a known machine learning technique.

The map information setting unit 325 registers image data of a map and sets a point at which a wide-angle image is captured on the map. The map information setting unit 325 can determine and set a position on the map to which the extracted partial image corresponds.

The storing unit 326 controls the storage device 240 of the image processing apparatus 120 and stores a wide-angle image, a partial image, various tables, and the like. Examples of the table stored in the storing unit 326 include a content table, a wide-angle image table, and a partial image table. Each table will be described below with reference to FIG. 4.

FIGS. 4A to 4C are diagrams illustrating various tables stored in the storing unit 326 of the present embodiment. FIG. 4A illustrates an example of the content table. FIG. 4B illustrates an example of the wide-angle image table. FIG. 4C illustrates an example of the partial image table. In the embodiment described below, the content for providing a service for introducing a real estate property is described as an example. However, embodiments are not particularly limited to such a content, and other content may be used.

As illustrated in FIG. 4A, the content table includes a content identification (ID) field 411 and a content name field 412. The content ID field 411 stores a content ID for uniquely identifying the content. The content name field 412 can store the name of the content arbitrarily selected by the operator who edits the content. In the example of FIG. 4A, the names of real estate properties are input in the content name field 412.

As illustrated in FIG. 4B, the wide-angle image table includes a wide-angle image ID field 421, a wide-angle image storage location field 422, a wide-angle image name field 423, and a related content ID field 424. The wide-angle image ID field 421 stores a wide-angle image ID for identifying a wide-angle image. The wide-angle image storage location field 422 stores information indicating a storage location at which the wide-angle image is stored. In the example of FIG. 4B, the wide-angle image storage location field 422 stores a unique resource locator (URL). However, embodiments are not particularly limited thereto and the wide-angle image storage location field 422 may store, for example, a path indicating a folder in which a wide-angle image is stored may be stored. The wide-angle image name field 423 stores the name of the wide-angle image. The name of the wide-angle image may be any name and can be input by the operator. FIG. 4B illustrates an example in which "living", "kitchen", "entrance", and the like are input as the names of the rooms in which the wide-angle images are captured in the property. The related content ID field 424 stores a content ID associated with the wide-angle image. For example, when the image of the "living" whose wide-angle image ID is "B0001" is captured in the "A apartment, No. 101", the related content ID field 424 stores the content ID "A0001" corresponding to the "A apartment, No. 101" as illustrated in FIG. 4B. Associating the content with the wide-angle image in this manner can facilitate management of the wide-angle image.

As illustrated in FIG. 4C, the partial image table includes a partial image ID field 431, a partial image storage location field 432, a partial image name field 433, an extraction source wide-angle image ID field 434, and an extraction position information field 435. The partial image ID field 431 stores a partial image ID for identifying a partial image. The partial image storage location field 432 stores information indicating a storage location in which the partial image is stored. In the example of FIG. 4C, the partial image storage location field 432 stores a URL. However, embodiments of the present disclosure are not particularly limited thereto and for example, a path indicating a folder in which a partial image is stored may be stored. The partial image name field 433 stores the name of a partial image. For example, as illustrated in FIG. 4C, the names of the partial images can be given serial numbers to the names of the wide-angle images as extraction sources. Such a configuration can facilitate recognition of the relationship between the partial image and the wide-angle image. The name of the partial image may be any other name than the above-described names. For example, the partial image generating unit 324 may also serve as a determining unit to determine the name of a characteristic subject included in the partial image and use the identified name as the partial image name. The extraction source wide-angle image ID field 434 stores the ID of the wide-angle image from which the partial image is extracted. Thus, the wide-angle image and the partial image can be associated with each other, and the content can be easily created and edited. The extraction position information field 435 stores coordinate data indicating from which position of the wide-angle image of the extraction source the partial image is extracted. In the example of FIG. 4C, the extraction position information is expressed such that a rectangular region can be defined by the coordinates of the extraction start position and the coordinates of the extraction end position. The extraction position information may be expressed by any other method than the above-described method. For example, when the wide-angle image is an omnidirectional image, the extraction position information may be represented by the latitude and longitude of a spherical coordinate system.

Note that the software blocks described in FIG. 3 correspond to functional units that are implemented by causing each piece of hardware to function by the CPU 210 executing the program of the present embodiment. All the functional units illustrated in each embodiment may be implemented in software, or part or all of the functional units may be implemented as hardware that provides equivalent functions.

Furthermore, all of the functional units described above do not necessarily have to be configured as illustrated in FIG. 3. For example, in some embodiments, each functional unit may be implemented by cooperation of the content editing terminal 110 and the image processing apparatus 120.

FIG. 5 is a flowchart of processing for creating content in the present embodiment. Each processing illustrated in FIG. 5 is mainly performed by the image processing apparatus 120, except for some processing. In the following description, FIG. 5 is described with reference to FIG. 4 as appropriate. When the image processing apparatus 120 starts processing, in step S501, the wide-angle image receiving unit 321 receives a wide-angle image from the content editing terminal 110.

After receiving the wide-angle image, the process stores the wide-angle image in the storing unit 326 in step S502. In addition, in step S502, the table creating unit 322 updates the wide-angle image table. Specifically, the table creating unit 322 assigns a wide-angle image ID to the received wide-angle image and stores a storage location. When the operator inputs a wide-angle image name, the wide-angle image name is stored.

In step S503, the process branches depending on whether there is another wide-angle image. If there is another wide-angle image (YES), the process returns to step S501, and the above processing is repeated. When there is no other wide-angle image (NO), the process proceeds to step S504. The determination of the presence or absence of another wide-angle image may be performed at a timing other than the timing of step S503. For example, the determination of the presence or absence of another wide-angle image may be performed after the processing of generating partial images from one wide-angle image is performed.

In step S504, the table creating unit 322 creates content and associates the content with the wide-angle image. The table creating unit 322 stores the content ID and the content name in the content table in association with each other as described with reference to FIG. 4A. In the association in step S504, the wide-angle images received up to step S504 are associated with the content IDs, and the wide-angle image table is updated. For example, when the wide-angle image of "living" or "kitchen" in FIG. 4 is an image captured in "room A 101", the table creating unit 322 stores "A0001" corresponding to "A apartment, No. 101" in the related content ID field 424 as illustrated in FIG. 4B. Associating the wide-angle image with the content in this manner, the wide-angle image included in the content can be defined.

In step S505, the correction processing unit 323 performs various corrections on the wide-angle image. Examples of the correction in step S505 include, for example, correction for adjusting the hue, brightness, and the like of the wide-angle image and zenith correction based on metadata indicating the imaging attitude of the imaging apparatus 111 in a case where the wide-angle image is an omnidirectional image. The process of step 505 may be omitted.

Next, in step S506, the partial image generating unit 324 generates a partial image from the wide-angle image. The partial image can be extracted by pattern matching, template matching, or the like based on the feature amount, and the partial image generating unit 324 can generate a region including a characteristic subject as the partial image. The partial image generating unit 324 may generate a plurality of partial images from one wide-angle image.

Thereafter, in step S507, the table creating unit 322 creates a partial image table. The names stored in the partial image name field 433 of the partial image table may be wide-angle image names with serial numbers. When the name of a characteristic subject included in a partial image can be determined, the name may be the name of the subject.

Next, in step S508, the content is edited and various settings are made by an operation via the content editing terminal 110. The operator who creates the content can download the partial image from the image processing apparatus 120 to the content editing terminal 110. Thereafter, the process is terminated.

According to the above-described processing, a partial image can be cut out from one wide-angle image and generated as a still image, thus allowing the cost of content creation to be reduced. The above-described processing allows the still image, which is a partial image, and the wide-angle image, which is an extraction source of the still image, to be managed as one group, thus reducing time and effort for content management.

Figure 6:
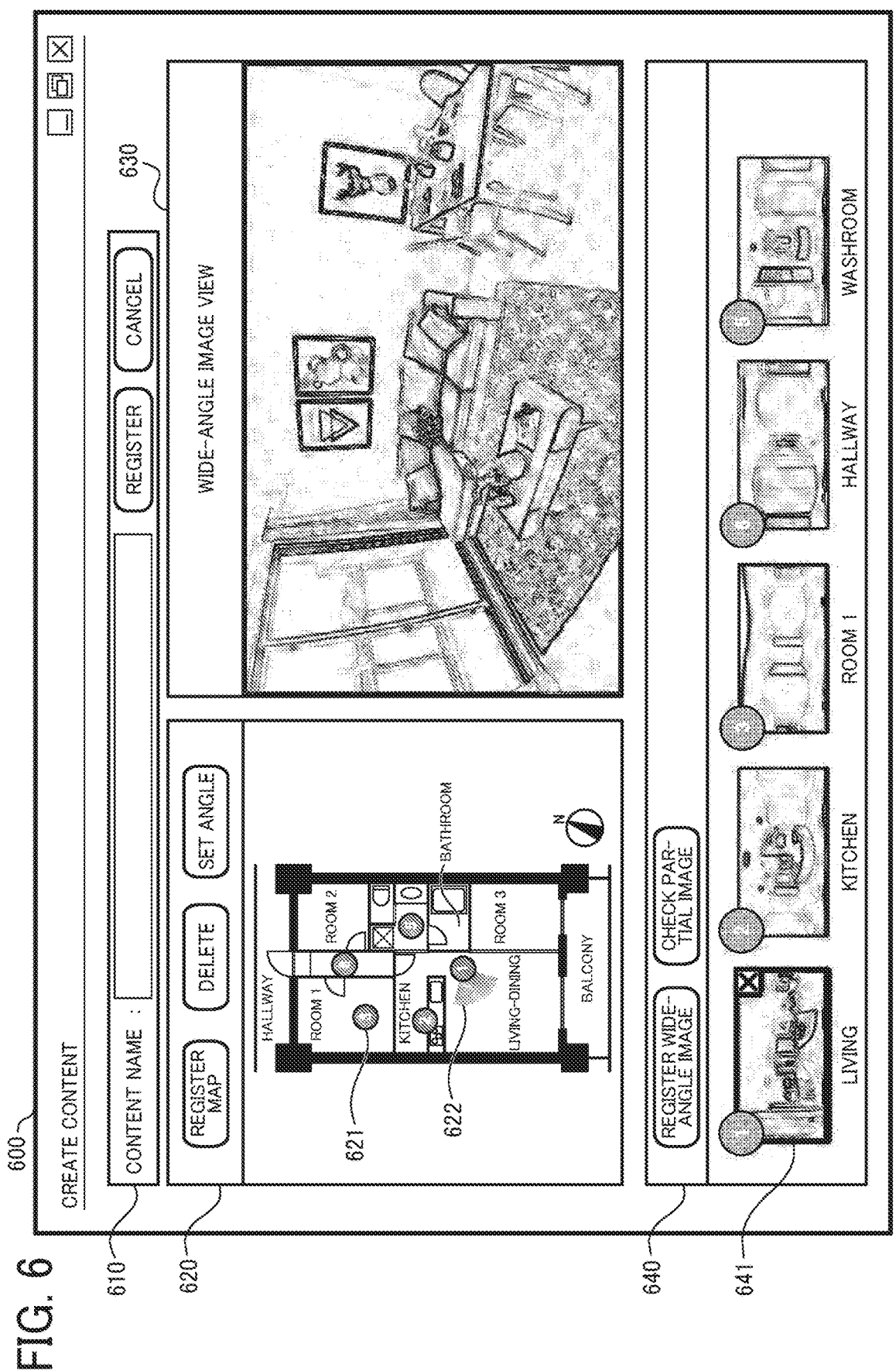
FIG. 6 is a diagram of an example of a screen for creating content according to an embodiment of the present disclosure.

Next, examples of various UIs displayed on the content editing terminal 110 in the present embodiment are described with reference to FIGS. 6 and 7. FIG. 6 is a diagram of an example of a screen for creating content in the present embodiment.

Initially with reference to FIG. 6, a description is given of the example of the screen. As illustrated in FIG. 6, the content creation screen 600 includes a content name registration area 610, a map setting area 620, a wide-angle image view area 630, and a wide-angle image registration area 640.

When the content name is input to the input form in the content name registration area 610 and the registration button is pressed, the table creating unit 322 registers the input content name in the content table and associates the content name with the content ID.

A map of a place where the wide-angle image is captured is displayed in the map setting area 620. Since the content described in the present embodiment is a service for introducing real estate properties, a floor plan is illustrated as an example of a map. An icon 621 indicating the capturing position of the wide-angle image and a fan-shaped icon 622 indicating the angle of the wide-angle image are superimposed on the map. The wide-angle image on the map can be arranged by, for example, operating the wide-angle image displayed in the wide-angle image registration area 640 by drag-and-drop or the like. As an example in FIG. 6, for example, the wide-angle image of "living" in the wide-angle image registration area 640 can be arranged by dragging and dropping the wide-angle image to "living-dining" in a floor plan as a map. The arrangement of the wide-angle image on the map is not limited to the above-described example, and for example, a character string in the map may be recognized and arranged in association with the wide-angle image. The display mode of each icon is not limited to the display mode illustrated in FIG. 6.

In the wide-angle image view area 630, a wide-angle image selected on the map or in the wide-angle image registration area 640 is previewed. The range of the wide-angle image displayed in the wide-angle image view area 630 is represented by the fan-shaped icon 622 described above.

In the wide-angle image registration area 640, a registered wide-angle image is displayed together with a name (see the registered wide-angle image 641 in FIG. 6). In the example of FIG. 6, wide-angle images of "living", "kitchen", "room 1", "hallway", and "washroom" are displayed. Here, when the partial image check button is pressed, the screen transitions to the screen illustrated in FIG. 7.

Figure 7:
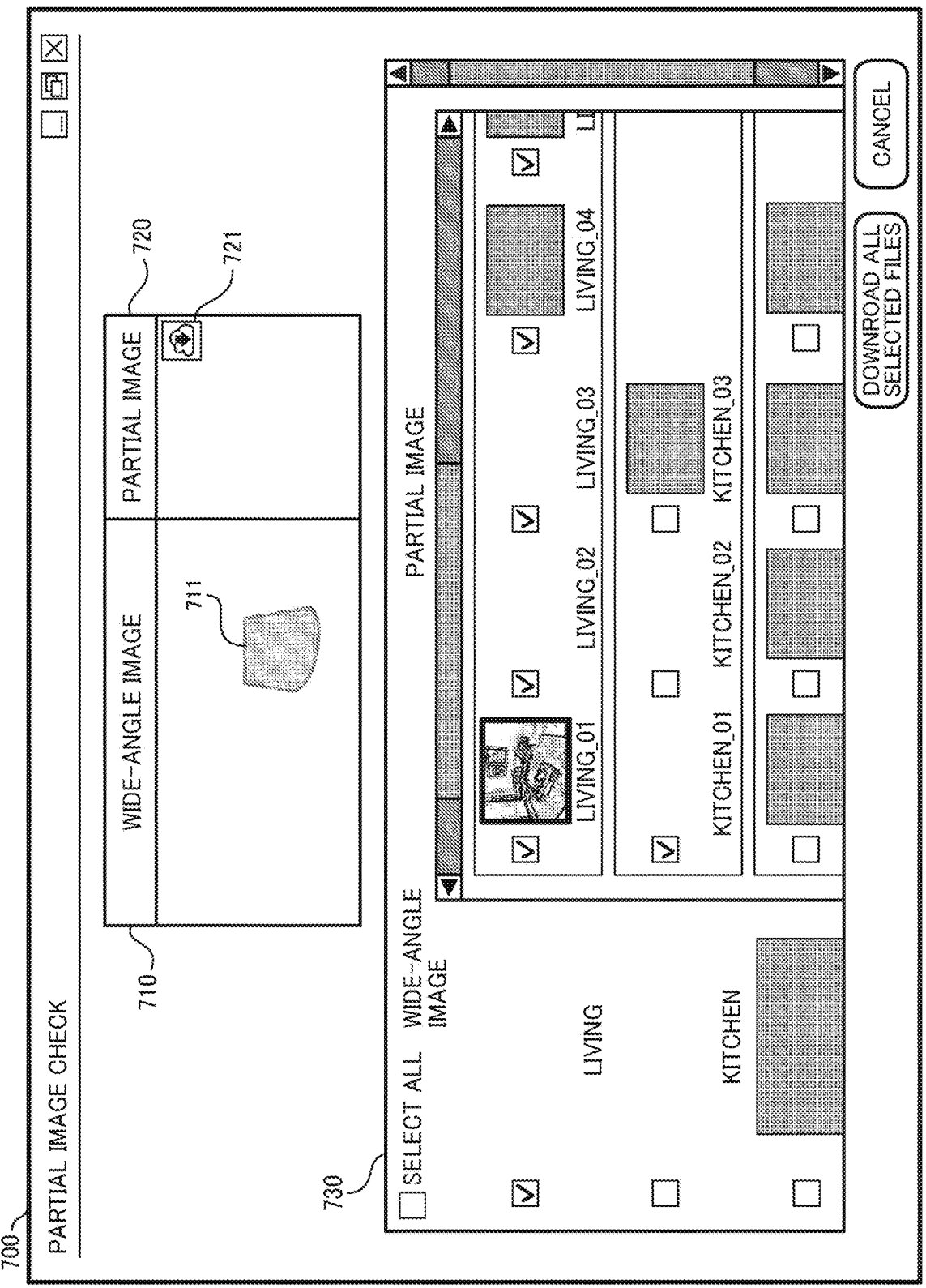
FIG. 7 is an illustration of an example of a screen for checking a partial image according to an embodiment of the present disclosure.

FIG. 7 is an illustration of an example of a screen for checking a partial image in the present embodiment. When the partial image check button in the wide-angle image registration area 640 is pressed, a partial image check screen 700 illustrated in FIG. 7 is displayed. The partial image check screen 700 includes a wide-angle image view area 710, a partial image view area 720, and a partial image selection area 730.

The wide-angle image view area 710 displays a wide-angle image from which the partial image selected in the partial image selection area 730 is extracted. In the example of FIG. 7, in response to the selection of "living_01" in the partial image selection area 730, the wide-angle image view area 710 displays a wide-angle image of "living". Note that the wide-angle image view area 710 may include an extent indicating a region extracted as a partial image (for example, as indicated by a region 711 in FIG. 7, a display with a different color or an emphasized display).

The partial image view area 720 displays the partial image selected in the partial image selection area 730. In the example of FIG. 7, in response to the selection of "living_01" in the partial image selection area 730, the partial image view area 720 displays the image. The partial image view area 720 may include an operation button 721 for downloading the displayed partial image. When the operation button 721 is pressed, the image displayed in the partial image view area 720 can be downloaded to the content editing terminal 110.

The partial image selection area 730 displays a wide-angle image and a partial image generated from the wide-angle image in association with each other. That is, the partial image selection area 730 executes display with reference to the partial image table. In the example of the screen display illustrated in FIG. 7, wide-angle images such as "living" and "kitchen" and a plurality of partial images ("living_01", "kitchen_01", and the like) generated from the wide-angle images are displayed side by side in the horizontal direction. Further, by selecting a partial image from the check box of the partial image selection area 730, the operator can download the selected partial image to the content editing terminal 110 at once.

Figure 8A:
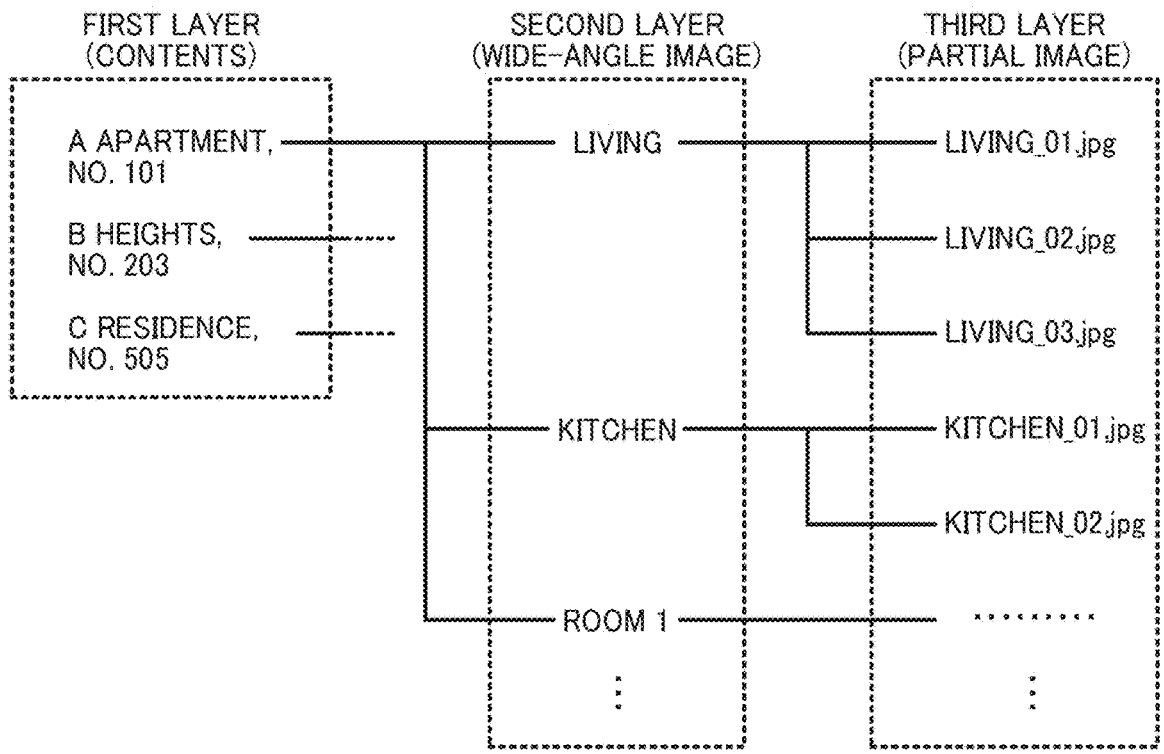
FIGS. 8A and 8B are diagrams of examples of a folder structure for storing downloaded partial images according to an embodiment of the present disclosure.
Figure 8B:
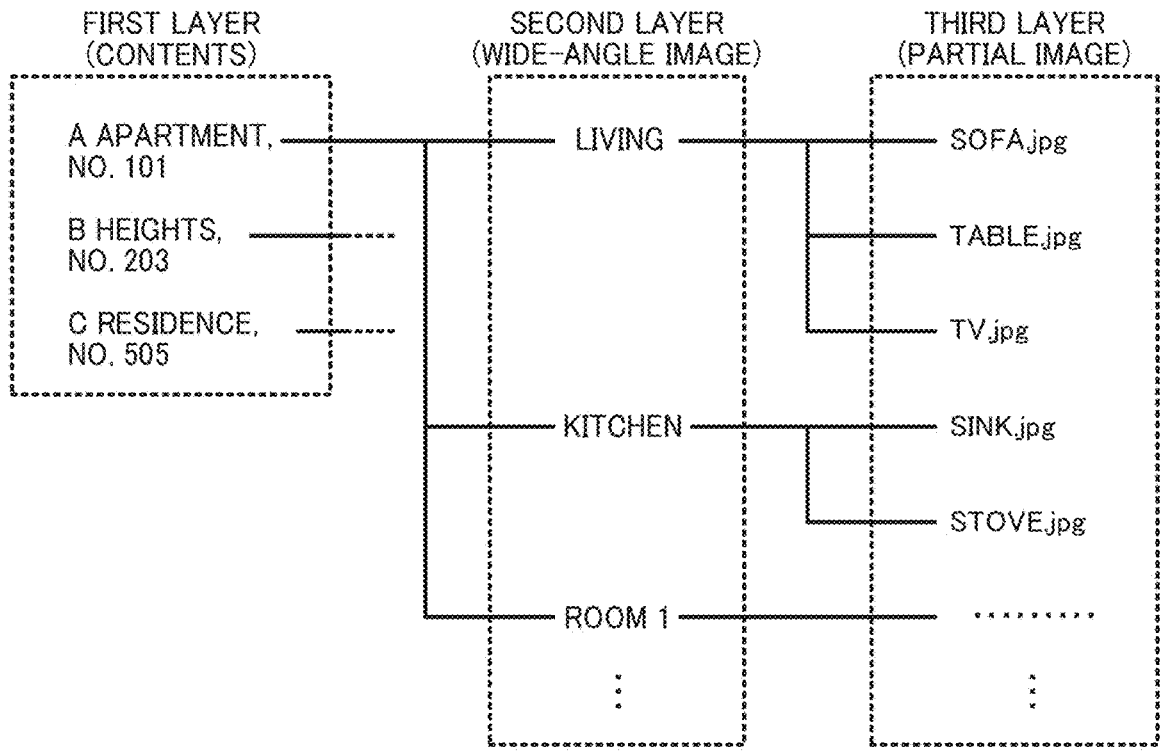

As described above, the operator who creates and edits the content can download the partial image from the partial image check screen 700 to the content editing terminal 110. Therefore, by capturing the wide-angle image, the operator can acquire both the wide-angle image and the still image (meaning the partial image). Here, a folder structure in which downloaded partial images are stored in the present embodiment is described. FIGS. 8A and 8B are diagrams of examples of a folder structure for storing downloaded partial images according to the present embodiment.

When the partial image is downloaded to the content editing terminal 110, the content editing terminal 110 stores the partial image in a folder structure as illustrated in FIG. 8A. That is, the content editing terminal 110 creates folders of content names ("A Apartment, No. 101", "B Heights, No. 203", "C Residence, No. 505", and the like) as the first layer. The content editing terminal 110 also creates folders ("living", "kitchen", "room 1", and the like) of wide-angle image names associated with the contents as a second layer in each folder of the first layer. The content editing terminal 110 stores the image files ("living_01.jpg" and the like) of the partial images generated from the wide-angle image in the folders of the second layer. By storing the data of the partial images in the folder having such a hierarchical structure, the operator can easily manage the images, and the burden of content creation and the labor of image management can be reduced.

When the partial image generating unit 324 has an object recognition function and can determine the name of a subject included in a partial image, the name of the subject may be used as the partial image name as illustrated in FIG. 8B. In FIG. 8B, the image file names of the partial images in the third layer are the article names of the subjects included in the partial image, such as "sofa.jpg" and "table.jpg". Such a configuration can further facilitate the operator to manage the images.

Next, the map in the present embodiment is described. In the case where the content of the present embodiment includes a plurality of wide-angle images, points at which the wide-angle images are captured can be displayed on the map. Thus, the presence of the image in the content can be further enhanced, and the appeal to the viewer of the content can be enhanced. Therefore, in the present embodiment, the map and the wide-angle image are set to be associated with each other.

Figure 9A:
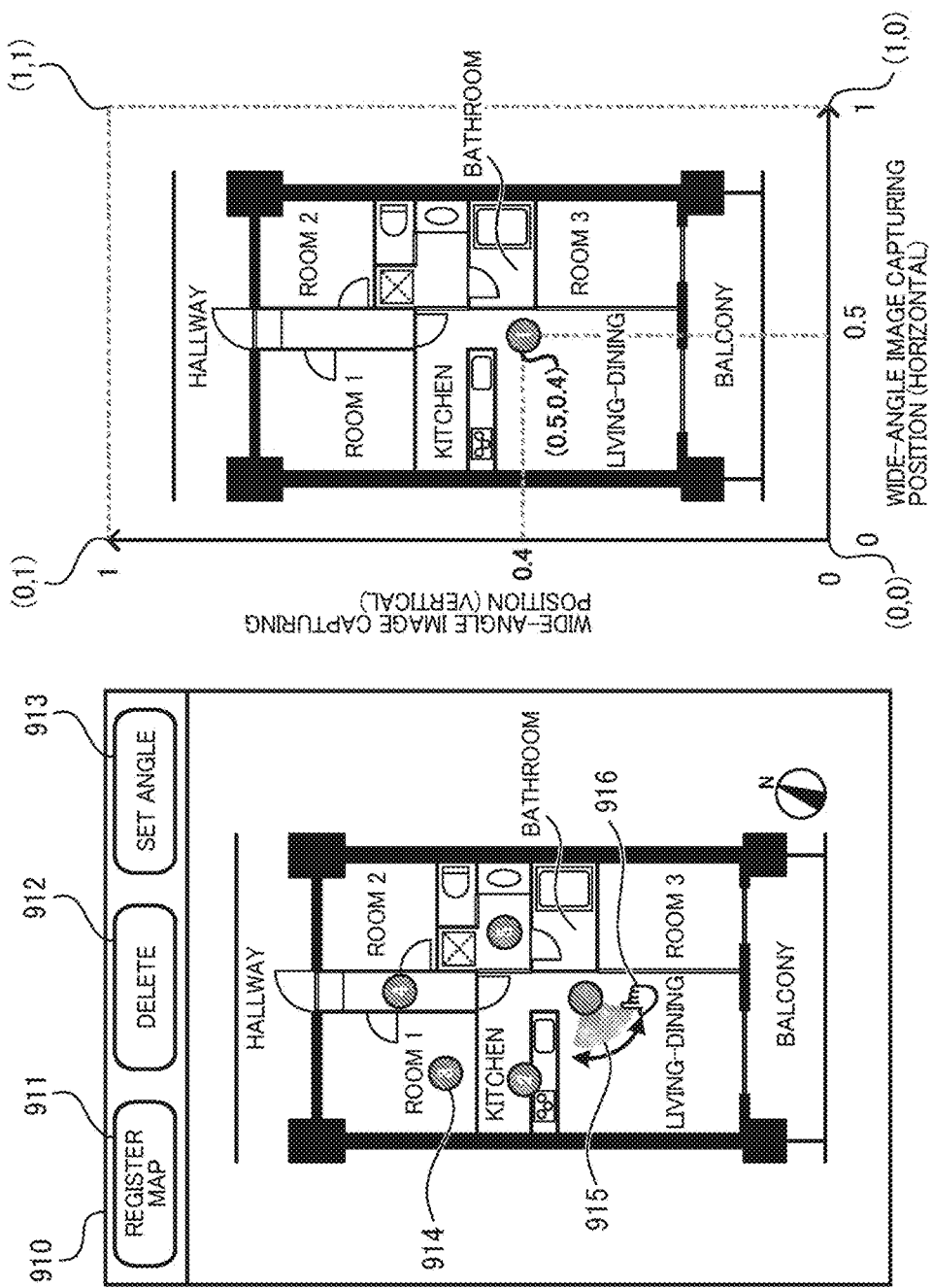
FIGS. 9A to 9C are diagrams of settings of wide-angle images on maps according to an embodiment of the present disclosure.
Figure 9B:
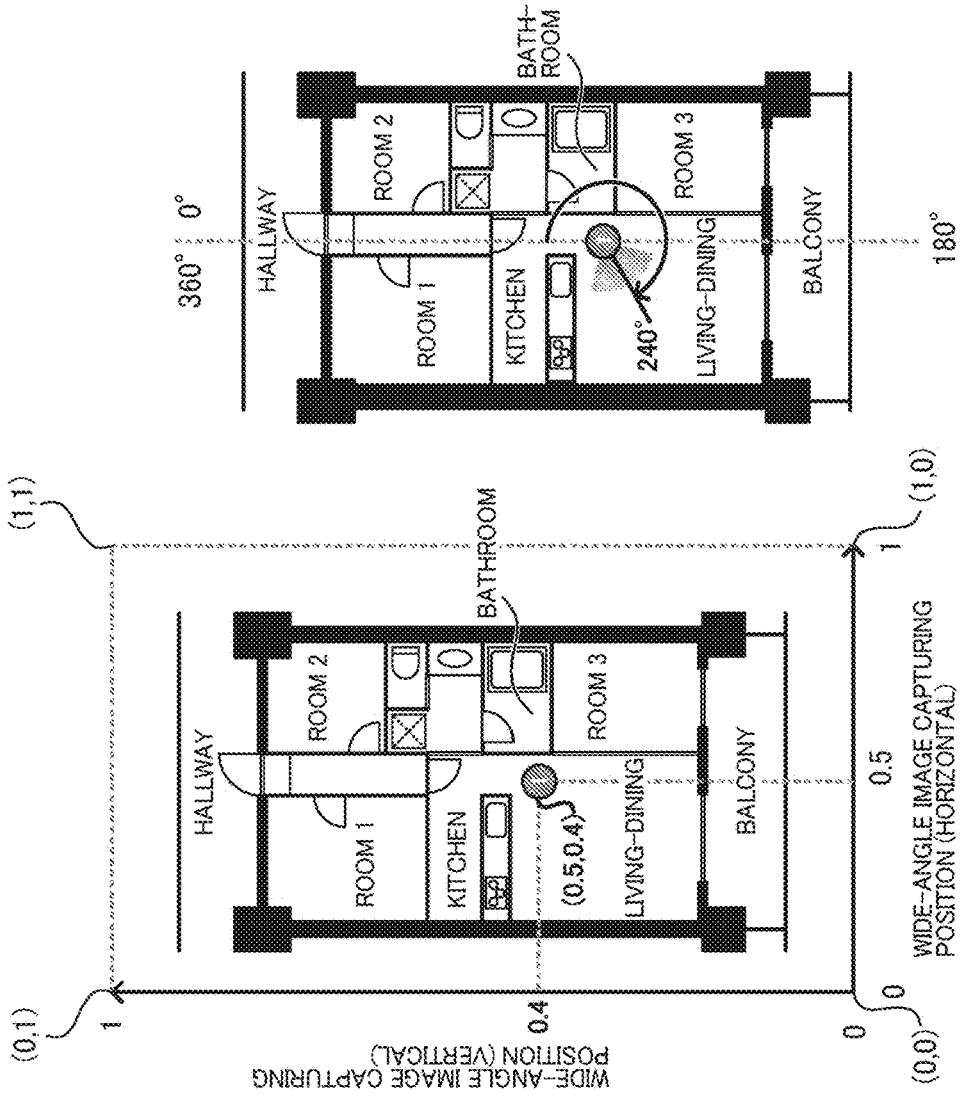
Figure 9C:
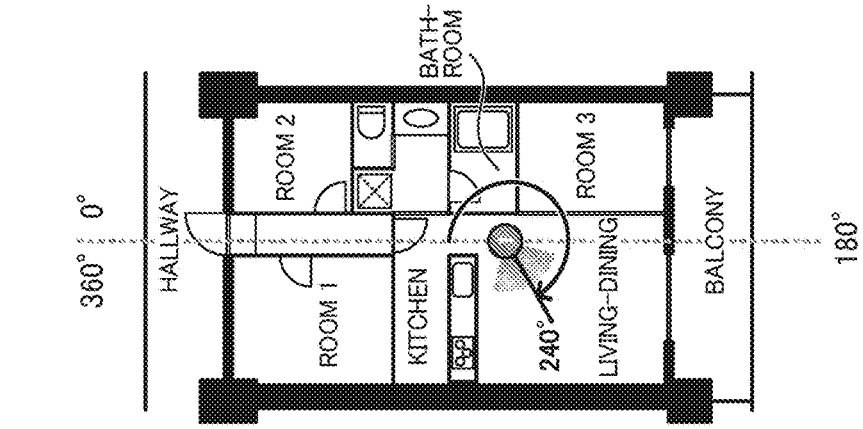

FIGS. 9A to 9C are diagrams of settings of wide-angle images on maps in the present embodiment. FIG. 9A illustrates a map setting area 910 included in the content creation screen 600, which corresponds to the map setting area 620 in FIG. 6. The map setting area 910 includes a map registration button 911, a delete button 912, and an angle setting button 913. A capturing position icon 914 and an angle icon 915 are displayed on the map in the map setting area 910 in a superimposed manner. The arrangement position of the capturing position icon 914, the angle of the line-of-sight direction of the angle icon 915, and the like can be changed and set by, for example, performing a drag-and-drop operation on the icon with the mouse cursor 916.

FIG. 9B depicts an example of a method of defining the capturing position of the wide-angle image. The capturing position can be defined by, for example, a ratio in the case where each of the length in the horizontal direction and the length in the vertical direction of the map image is 1. In the example of FIG. 9B, the capturing position icon is at a position of 0.5 in the horizontal direction of the image and at a position of 0.4 in the vertical direction. In such a case, the coordinates of the capturing position of the icon can be expressed as (0.5, 0.4).

FIG. 9C depicts an example of a method of defining the direction of the angle of the wide-angle image. The direction of the angle can be defined as, for example, the direction of the optical axis of the imaging apparatus 111 (the direction of the center of the wide-angle image) when the upward direction of the map image is 0°/360° and the downward direction is 180°. In the example of FIG. 9C, the center of the icon indicating the angle of the capturing position icon is oriented in the direction of 240°.

The method of defining the capturing position and the direction of the angle of the wide-angle image is not limited to the methods illustrated in FIGS. 9B and 9C, and other methods may be used.

FIGS. 10A and 10B are tables including map information in the present embodiment. When the map is registered in the present embodiment, the table creating unit 322 creates a table by associating the content with the map. Note that, in FIGS. 10A and 10B, a table corresponding to the partial image table in FIG. 4 is omitted.

FIG. 10A illustrates an example of a content table in which a map is registered, and includes a content ID field 1011, a content name field 1012, and a map ID field 1013. The content ID field 1011 and the content name field 1012 are the same as the content ID field 411 and the content name field 412 described in FIG. 4A, and redundant descriptions thereof are omitted. The map ID field 1013 stores an ID for identifying each map.

FIG. 10B depicts an example of a wide-angle image table in which a map and a wide-angle image are associated with each other. As illustrated in FIG. 10B, the wide-angle image table includes a wide-angle image ID field 1021, a related map ID field 1022, a capturing position icon field 1023, a capturing position coordinate field 1024, and a direction of angle field 1025. Although omitted in FIG. 10B, the wide-angle image table includes the wide-angle image storage location field 422, the wide-angle image name field 423, and the related content ID field 424 illustrated in FIG. 4A.

The related map ID field 1022 stores the ID of the map associated with the content including the wide-angle image. The capturing position icon field 1023 stores the number of an icon indicating the capturing position of the wide-angle image on the map. The capturing position coordinate field 1024 stores the coordinates of the capturing position of the wide-angle image on the map. The direction of angle field 1025 stores an angle indicating the direction of the center of the wide-angle image. In the example of FIG. 10B, the capturing position coordinate field 1024 and the direction of angle field 1025 store coordinates and directions defined by the methods described with reference to FIGS. 9B and 9C.

Associating the wide-angle image with the map in this manner allows a partial image generated from the wide-angle image to be associated with an image obtained by capturing a position and a direction on the map, thus enhancing the convenience of content.

Figure 11:
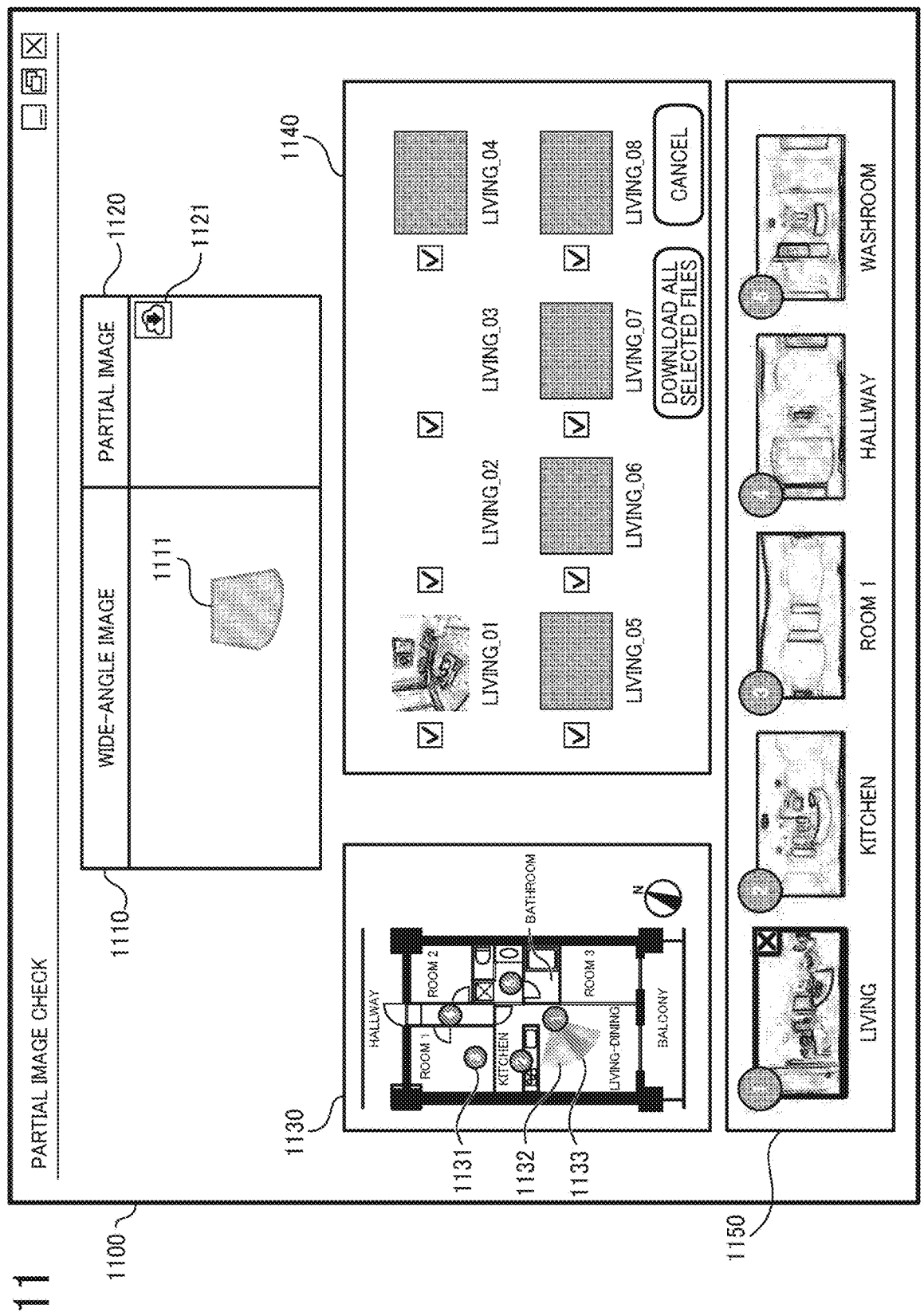
FIG. 11 is a diagram of an example of a partial image check screen including a map according to an embodiment of the present disclosure.

FIG. 11 is a diagram of an example of a partial image check screen 1100 including a map in the present embodiment. The partial image check screen 1100 illustrated in FIG. 11 includes a wide-angle image view area 1110, a partial image view area 1120, a map display area 1130, a partial image selection area 1140, and a wide-angle image selection area 1150. The wide-angle image view area 1110, the partial image view area 1120, and the partial image selection area 1140 are the same as those described with reference to FIG. 7, and a redundant description thereof is omitted. The wide-angle image selection area 1150 corresponds to the wide-angle image registration area 640 illustrated with reference to FIG. 6.

In the map display area 1130, an icon 1131 indicating a wide-angle image and an icon 1132 indicating an angle of the wide-angle image are displayed so that the icon 1131 and the icon 1132 are superimposed on the image of the registered map. In the map display area 1130 of FIG. 11, an icon 1133 superimposed on the icon 1132 and represented by a fan-shaped icon of dark color is an icon indicating the angle of view and the direction of a partial image generated from the wide-angle image (hereinafter the icon 1133 is referred to as angle of view icon 1133). Defining the angle of the wide-angle image as described in FIG. 9 allows calculation of which direction on the map the partial image generated from the wide-angle image matches. That is, based on the angle of the wide-angle image and the extraction position information of the partial image, the capturing direction and the like of the partial image can be calculated. Thus, the angle of view icon 1133 of the partial image as illustrated in FIG. 11 can be displayed. The partial image view area 1120 displays a partial image corresponding to the angle of view icon 1133. Accordingly, the operator can easily recognize from which position and in which direction on the map the partial image displayed in the partial image view area 1120 is captured. As described above, associating the map with the wide-angle image facilitate grasping of which position the partial image corresponds to, and the operator can more easily create the content.

According to the above-described embodiments of the present disclosure, there can be provided an image processing system, an image processing apparatus, and a method for creating a partial image while reducing the burden on the operator.

Each function of the above-described embodiments of the present disclosure can be implemented by a program which can be executed by a device and is written in C, C++, C#, Java (registered trademark), or the like. The program according to the present embodiment can be stored in a device-readable recording medium such as a hard disk device, a compact disc-read only memory (CD-ROM), a magneto-optical (MO) disc, a digital versatile disc (DVD), a flexible disk, an electronically erasable and programmable read only memory (EEPROM), and an erasable programmable read-only memory (EPROM) and distributed, and can be transmitted via a network in a format which can be read by other devices.

The embodiments and the modifications of the embodiments are included in the scope and gist of the invention, and are included in the invention described in the claims and equivalents of the claims. The above-described embodiments are illustrative and do not limit the present invention.

Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority to Japanese Patent Application No. 2019-174558, filed on Sep. 25, 2019, in the Japan Patent Office, the entire disclosure of which is hereby incorporated by reference herein.

REFERENCE SIGNS LIST

1 System
110 Content editing terminal
111 Imaging apparatus
120 Image processing apparatus
130 Content storage server
140 Content viewing terminal
210 CPU
220 RAM
230 ROM
240 Storage device
250 Communication I/F
260 Monitor
270 Input device
311 Wide-angle image acquiring unit
312 Communication unit
313 Display unit
314 Operation unit
321 Wide-angle image receiving unit
322 Table creating unit
323 Correction processing unit
324 Partial image generating unit
325 Map information setting unit
326 Storing unit

The invention claimed is:

1. An image processing apparatus comprising:
first processing circuitry configured to
    determine a subject included in a wide-angle image,
    generate a partial image including the subject from the wide-angle image,
    store the partial image, in a nonvolatile storage device, in association with the wide-angle image from which the partial image is extracted,
    create content including one or more wide-angle images stored in the nonvolatile storage device and one or more partial images associated with the one or more wide-angle image, respectively,
    transmit an editing screen for creating the content to a content editing terminal, and
    edit the content based on an instruction from the content editing terminal.

2. The image processing apparatus according to claim 1, wherein the nonvolatile storage device is configured to store identification information of the wide-angle image in association with the wide-angle image and the partial image.

3. The image processing apparatus according to claim 1, wherein the nonvolatile storage device is configured to store coordinates indicating a range of the partial image in the wide-angle image in association with the wide-angle image and the partial image.

4. The image processing apparatus according to claim 1, wherein the nonvolatile storage device is configured to store the partial image in association with the wide-angle image for each piece of content to be edited.

5. The image processing apparatus according to claim 1, wherein the first processing circuitry is configured to determine a name of the subject, and
wherein the nonvolatile storage device is configured to store the determined name of the subject as a file name of the partial image including the subject.

6. The image processing apparatus according to claim 1, wherein the nonvolatile storage device is configured to store the wide-angle image in association with a map of a place where the wide-angle image is captured.

7. The image processing apparatus according to claim 6, wherein the nonvolatile storage device is configured to store a capturing position and a capturing direction of the wide-angle image in the map.

8. An image processing system comprising:
the image processing apparatus according to claim 1; and
the content editing terminal including a display configured to indicate a region corresponding to the partial image to display the wide-angle image from which the partial image is extracted.

9. The image processing system according to claim 8, wherein the display is configured to display an icon indicating an angle of view of the partial image on a map.

10. The image processing apparatus according to claim 1, wherein the first processing circuitry is configured to determine the subject based on a structure of a building included in the wide-angle image.

11. An image processing system comprising:
the image processing apparatus according to claim 1; and
the content editing terminal including second processing circuitry configured to
    download the partial image, and
    store the downloaded partial image in a folder corresponding to the wide-angle image from which the partial image is extracted.

12. The image processing system according to claim 11, further comprising a display configured to indicate a region corresponding to the partial image to display the wide-angle image from which the partial image is extracted.

13. The image processing system according to claim 12, wherein the display is configured to display an icon indicating an angle of view of the partial image on a map.

14. A method comprising:
determining a subject included in a wide-angle image;
generating a partial image including the subject from the wide-angle image;
storing, in a nonvolatile storage device, the partial image in association with the wide-angle image from which the partial image is extracted;
creating content including one or more wide-angle images stored in the nonvolatile storage device and one or more partial images associated with the one or more wide-angle image, respectively;
transmitting an editing screen for creating the content to a content editing terminal; and
editing the content based on an instruction from the content editing terminal.

15. An image processing system comprising:
the image processing apparatus according to claim 1; and
the content editing terminal including second processing circuitry configured to
display the one or more partial images generated from a respective wide-angle image, and
transmit a selection of a partial image of the one or more partial images to the image processing apparatus, and wherein the first processing circuitry is further configured to transmit, to the content editing terminal, the selected partial image.

16. An image processing system comprising:
the image processing apparatus according to claim 6; and
the content editing terminal including a display configured to display an icon, on the map, indicating an angle and a range of view of the one or more partial images associated with the wide-angle image.

17. The method of claim 14, further comprising:
determining a name of the subject; and
storing the determined name of the subject as a file name of the partial image including the subject.

18. The method of claim 14, further comprising:
displaying the one or more partial images generated from a respective wide-angle image;
receiving a selection of a partial image of the one or more partial images to the image processing apparatus; and
transmitting, to the content editing terminal, the selected partial image.

19. The method of claim 14, further comprising:
storing store the wide-angle image in association with a map of a place where the wide-angle image is captured; and
displaying an icon, on the map, indicating an angle and a range of view of the one or more partial images associated with the one or more wide-angle image.

20. The method of claim 14, further comprising:
determining the subject based on a structure of a building included in the wide-angle image.

* * * * *